United States Patent [19]

Manki et al.

[11] 4,025,050
[45] May 24, 1977

[54] BUTTERFLY VALVE

[75] Inventors: Yoshinori Manki, Nara; Takayoshi Uno, Osaka, both of Japan

[73] Assignee: Tomoe Technical Research Company, Osaka, Japan

[22] Filed: Mar. 24, 1976

[21] Appl. No.: 669,859

[52] U.S. Cl. .............................. 251/306; 251/368
[51] Int. Cl.² ................................ F16K 1/22
[58] Field of Search .................. 251/305–308, 251/368

[56] References Cited
UNITED STATES PATENTS

| | | | |
|---|---|---|---|
| 3,346,005 | 10/1967 | Hanssen | 251/306 |
| 3,778,028 | 12/1973 | Graves et al. | 251/306 |
| 3,782,684 | 1/1974 | Stephens | 251/306 |
| 3,784,157 | 1/1974 | Wenglar | 251/306 |
| 3,837,620 | 9/1974 | Malloy et al. | 251/306 |

*Primary Examiner*—William R. Cline
*Assistant Examiner*—H. Jay Spiegel

[57] ABSTRACT

A butterfly valve comprises a valve body, a valve seat, a valve stem, a valve member and sealing assemblies. The valve seat has three layers such as a first, a second and a third layers which are formed from hard synthetic resin, resilient material and fluororesin respectively. An effective seal can be achieved by providing an inwardly convex contour on the inner peripheral surface of the valve seat.

6 Claims, 9 Drawing Figures

BUTTERFLY VALVE

The present invention relates to a butterfly valve in which a disk-like valve member rotates around a valve stem acting as a shaft.

The prior art to which the invention is directed includes the art of butterfly valves being of a type in which a usually circular vane or disk is rotatable in the valve passage between an open and closed position. When in the closed position, a valve member engages a valve seat with which it cooperates to provide a seal against leakage of the fluid in the pressurized line intended to be controlled by the valve. It is essential in valves of this type that the seal should be effective on each occasion of valve closing for the life of the valve to continuously provide positive shut off of the fluid without frequent maintenance and servicing of the seat.

The present invention is concerned with a butterfly valve provided with a valve seat having three layers which is completely unaffected by temperature changes and is not subject to wearing conditions by the corrosive fluid.

It is an important object of the present invention to provide a butterfly valve in which the inner peripheral surface of a valve body is provided with an annular projection so as to conform to the outer peripheral surface of a valve seat having three layers, whereby said valve seat is tightly engaged with the inner peripheral surface of the valve body.

It is another object of the present invention to provide a butterfly valve in which a valve seat has three layers such as a first layer formed from hard synthetic resin, a second layer from resilient material and a third layer from fluororesin.

It is a further object of the present invention to provide a butterfly valve in which the second layer of a valve seat is so formed that its barrel portion is thick relative to the side peripheral portions contacting the two side surfaces of the first layer.

It is still another object of the present invention to provide a butterfly valve in which the third layer forming the inner and side peripheral surfaces of a valve seat extends to provide inner peripheral surfaces of stem-inserting ports.

It is still another object to provide a butterfly valve in which there are provided sealing assemblies each comprising a rubber ring and a seal ring made of fluororesin which is disposed nearer to the valve member than the rubber ring, in order to prevent leakage of the liquid between a valve seat and a valve stem, said seal ring comprising a O-ring or a ring of V-shaped section.

It is still another object of the present invention to provide a butterfly valve in which the inner peripheral surface of a valve seat is so formed to have a raised central portion, whereby a valve member in a closed position is resiliently urged at its peripheral edge by the raised portion of the seat.

It is a still further object of the present invention to provide a butterfly valve in which a port of a valve member through which a valve stem is passed is provided in its interior with a cylindrical core of metal, said valve member being formed from chemical resistant resin.

An embodiment of the present invention will be described below with reference to the appended drawings, in which.

Figure 1:
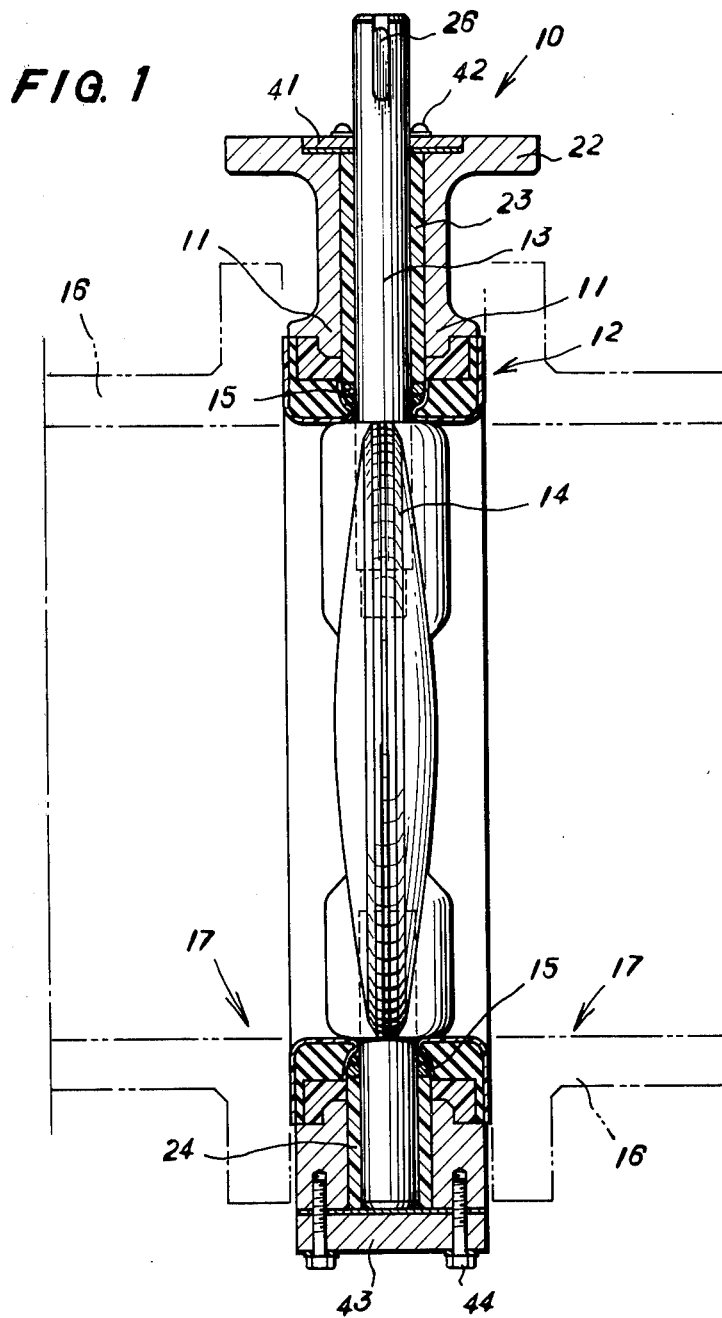
FIG. 1 is a longitudinal sectional view of a butterfly valve with a valve member in a position where a flowway passing through a valve seat is closed.

A butterfly valve 10 according to the present invention mainly comprises a valve body 11, a valve seat 12, a valve stem 13, a valve member 14 and sealing assemblies 15 and is disposed between two tubular flange members 16, 16 to control the fluid flow by opening and closing a flowway 17.

Figure 2:
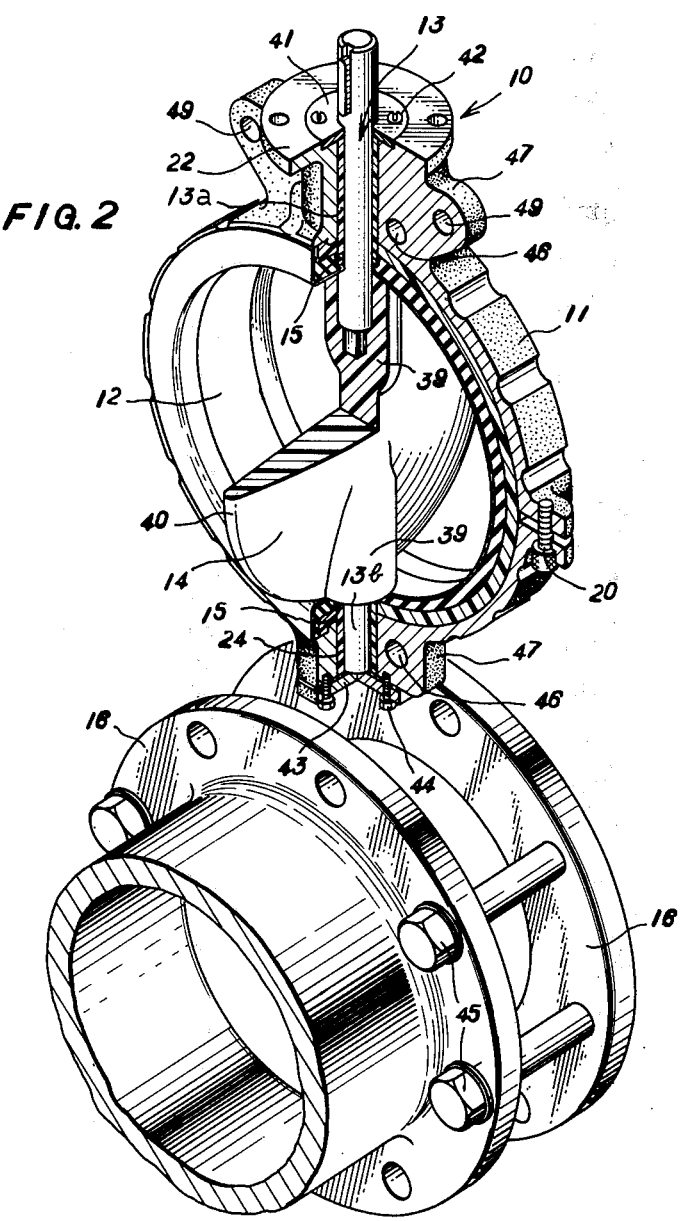
FIG. 2 is an explanatory view, partly broken away to show interior construction, of a valve body, a valve seat and a valve member of the valve of FIG. 1 removed from between the end faces of tubular flange members, the valve member being shown in an open position.
Figure 3:
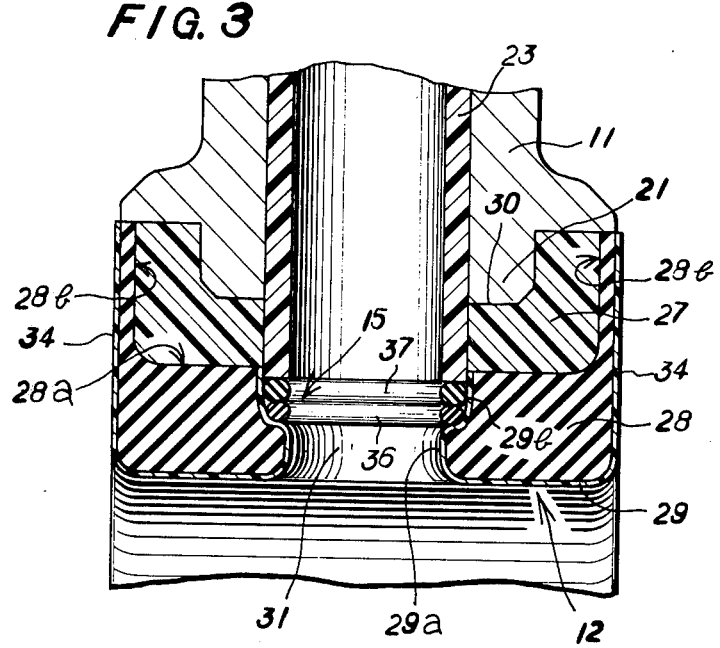
FIG. 3 is a fragmentary cross-sectional view of a valve body, a valve seat and a sealing assembly and a valve stem of the valve of FIG. 1 with the valve stem and the valve member removed, taken along the central line of the valve stem.

The valve body 11, which is formed from metal having the strength endurable for the internal pressure and anticorrosive properties for the fluid, such as ductile cast iron, is provided at the general center portion of the inner peripheral surface thereof with an annular projection 21, as shown in FIG. 1 and FIG. 3. As best seen in FIG. 2, the valve body 11 comprises two halves, which are held together by bolts 20. The numeral 22 designates a neck of the valve body. The valve stem 13 is disposed on a straight line that connects the center of the neck 22 with that of the valve body 11, extending through the valve seat 12 and the valve body 11. Located between the valve stem 13 and the valve 11 are stem guides 23, 24 for rotatably supporting the valve stem 13, which are made of fluororesin or similar materials.

The valve seat 12, as best seen in FIG. 3, comprises a first layer 27, a second layer 28 and a third layer 29 and is shaped like a ring as a whole. The general center portion of the outer peripheral surface of the first layer 27 is formed into an annular groove 30 for receiving a projection 21 of the valve body 11, whereby the first layer conforms to the inner peripheral surface of the valve body 11. The first layer 27, which is made of hard synthetic resin, such as phenol resin, melamine resin or the like, has a uniform thickness and embraces the projection 21 of the valve body 11.

The second layer 28 of the valve seat 12 is adhered to the inner peripheral surface of the first layer 27, its barrel portion 28a contacting the inner peripheral surface of the first layer being more than two times as thick as its side peripheral portions 28b, 28b contacting the two side surfaces of the first layer. The second layer is preferably formed so that the thickness of its side peripheral portions 28b, 28b is about 1/10 of that of its barrel portion 28a. That is to say, the side peripheral portions 28b, 28b are preferably formed thin, thereby permitting an effective sealing between the butterfly valve and the tubular flange members. The second layer 28 is made of resilient materials, such as synthetic rubber, plastics or similar materials having superior impact resilient and durable properties.

The third layer 29 comprises a thin film made of fluororesin such as polyfluoroethylenic resin. The third layer, having a uniform thickness, is adhered to the inner and side peripheral surfaces of the second layer 28, as well as to the inner peripheral surfaces of stem-inserting ports 31 of the valve seat 12 through which the valve stem 13 is passed. The port-defining parts 29a, 29b of the third layer are formed integrally with other parts of the same, which parts 29b located nearer to the valve body 11 are widen toward the first layer and provided in the interior with sealing assemblies. The dimension of the inner diameter of the part 29a is determined so as to provide a close fit of the valve stem.

Figure 4:
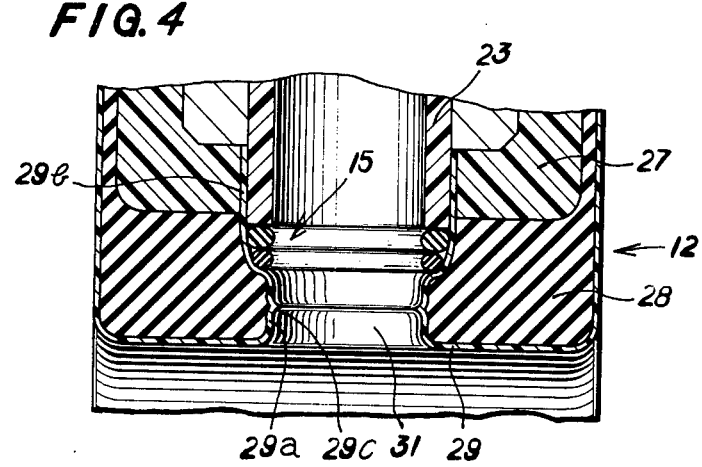
FIG. 4 is an enlarged sectional view of a portion of the valve seat provided with a stem-inserting port for a valve stem.

FIG. 4 shows a modified embodiment of the port-defining parts 29a, 29b of the third layer, in which the part 29a is provided with an annular projection 29c to effect sealing more completely between the valve stem and the valve seat, while the part 29b being extended outwardly for a desired distance to contact the first layer for easy insertion of the sealing assembly 15 and the stem guide 23.

The valve seat 12, which can be tightly fixed in the interior of the valve body 11 of metal, since the outer peripheral surface of the seat 12 conforms to the inner peripheral surface of the valve body 11 with the projection 21 of the body 11 fitted in the groove 30, has a larger width (dimension in the direction of fluid flowing) than that of the valve body 11, thereby slightly protruding beyond the latter, so that when the butterfly valve 10 is inserted between the tubular flange members 16, 16 and is bolted together, the seat 12 is pressed by the distance corresponding to said protrusion by means of the tubular flanges members 16, 16, whereby both sides 34, 34 of the valve seat 12 and the tubular flange members are brought into close contact with each other due to the resiliency of the material of the second layer 28. Therefore, a seal between the butterfly valve and the tubular flange members can be provided without the need for a gasket for piping.

Figure 5:
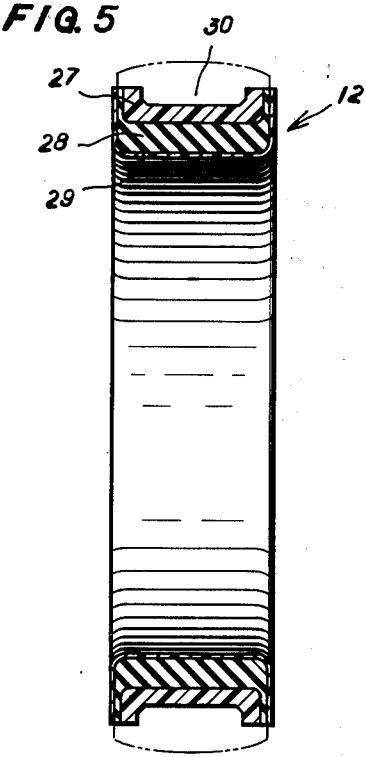
FIG. 5 is a cross-sectional view of the valve seat.

FIG. 5 shows a sectional view of the valve seat 12 taken substantially along a line passing through the center of the valve member except along the axis of the valve stem. The valve seat 12 comprises three layers, the second layer 28 of which is produced by way of vulcanization molding in such a manner that unvulcanized resilient material is preheated to be softened, and then injected between the coaxially disposed and preformed first and third layers 27, 29 to be heated. The first, second and third layers of the valve seat 12 thus produced are tightly contacted with one another in the metal mould by effecting vulcanization of resilient material of the second layer, as well as by means of adhesives. Further, the first layer is provided with a plurality of radially extending injecting holes, through which said resilient material is injected.

The inner peripheral surface of the cylindrical valve seat 12 shown in FIGS. 1, 3, and 5 provides a seat face for the valve member. The engagement of a valve seat having a smooth inner peripheral surface with the valve member makes it possible to provide a seal. However, a more effective seal can be achieved by providing an inwardly convex contour on the inner peripheral surface of the valve seat 12, as shown in FIG. 6.

Figure 6:
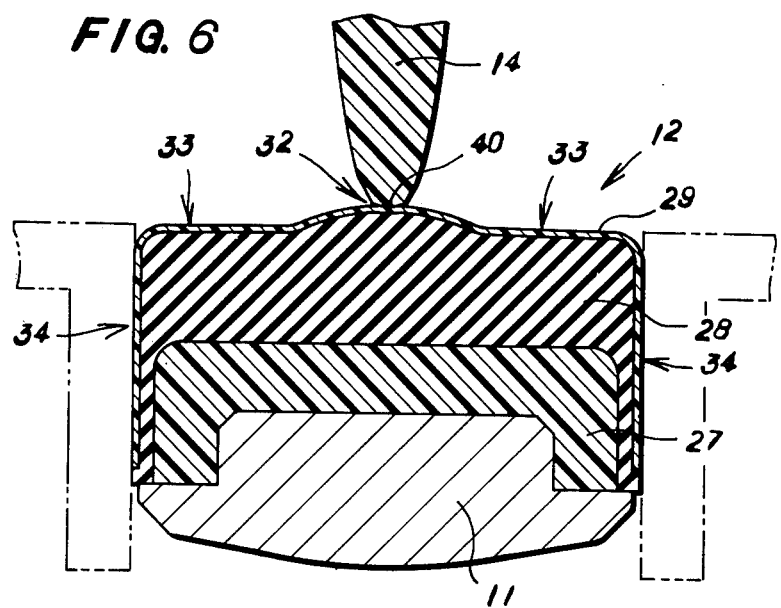
FIG. 6 is a sectional view of a modified embodiment of the valve seat and a portion of the valve member.

Referring to FIG. 6, the valve seat 12 is not of uniform inner diameter in the direction of the width (direction of the fluid flow), but the central portion of the inner peripheral surface thereof is raised and thus has a smaller diameter than the two side portions. The central raised portion 32 of convex section descends by a gradual slope to each of the side portions 33, 33, the edges of which are rounded, said edges leading to the side surfaces 34, 34.

The inner diameter of the valve seat 12 corresponding to the highest point of the convex portion 32 is smaller than the diameter of the valve member 14, whereby the valve member 14 is closed radially urging the highest point of the convex portion 32. When the valve member is in the closed position, the convex portion 32 of the valve seat is resiliently pressing the peripheral edge of the valve member, thereby permitting the fluid to be prevented from flowing therethrough. When the valve member is closed, the valve seat is deformed at the boundaries between the convex portion 32 and each of the side portions 33, 33, and any deformation is not produced in the valve seat which prevents sealing between the valve seat and other members. A further advantage of above-described structure of the valve seat 12 is that seat deformation, i.e., deformation which is produced in the side portions 33, 33 of the third layer (FIG. 6) when the seat 12 is inserted between tubular flange members and pressed thereby, can be moderated by the provision of said gradual slope of the side portions 33, 33.

As best seen in FIG. 3, the butterfly valve is provided with two sealing assemblies 15 into which the valve stem 13 is fitted to contact therewith. Each of the sealing assemblies 15 comprises an O-ring 36 made of fluororesin and a rubber ring 37. The rubber ring 37, which is disposed outside the O-ring 36, i.e., nearer to the valve body 11, is pressed inwardly by means of a stem guide 23. The O-ring 36 is pressed inwardly by the rubber ring 37 located thereon, thereby permitting air tight between the valve seat 12 and the valve stem 13. The rubber ring 37 is interposed between the O-ring 36 and the stem guide 23 to prevent the O-ring 36 from being damaged by the stem guide.

The provision of the sealing assemblies 15, 15 allows a seal between the valve seat 12 and the valve stem 13 to be effective and complete. In other words, the simple structure of sealing assemblies is such as to provide an effective seal against leakage of the fluid.

Figure 9:
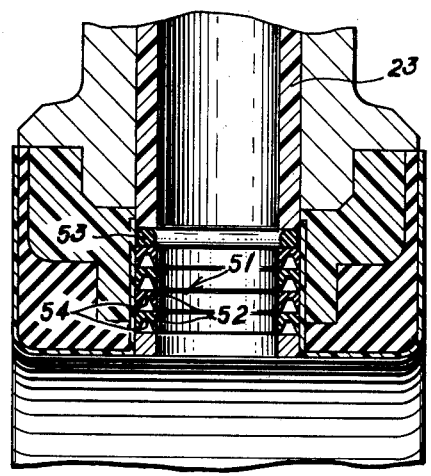
FIG. 9 is an enlarged sectional view of a portion of the valve seat of the butterfly valve provided with a modified embodiment of the sealing assembly.

Referring to FIG. 9, which shows a modified embodiment of the sealing assembly, a sealing assembly 51 comprises 4 rings 52 one of V-shaped section and a rubber ring 53, which are disposed in the interior 29a of the port covered by the third layer 29. Each of the rings 52 of V-shaped section, which is formed from resilient materials similar to those of the rubber ring, have an annular groove 54 into which is formed a face of a ring of rectangular section, said annular groove 54 having triangular section. It is sufficient to provide at least one said ring 52. Said rings 52 one of V-shaped section are pressed from the direction of the rubber ring 53, so that they may be stretched centrifugally as well as centripetally, thereby providing a seal against leakage of the fluid between the valve stem and the valve seat.

The valve stem 13 rotatably supported by the valve body 11 and the valve seat 12 comprises a first short stem 13a, which is guided by means of the stem guide 23, and a second short stem 13b, which is guided by a stem guide 24. One end of the first short stem 13a protrudes outwardly beyond the valve body 11, and either has a key 26 fitted therein, or is formed in a square pillar, so as to rotate the stem by means of a handle (not shown) or the like. The valve stem 13 may comprise a integrally formed shaft passed through the valve member.

The first short stem 13a and the second short stem 13b are so constructed that their ends opposite to each other are formed in square pillars, and planted in the valve member 14 extending diametrically thereof, as best seen in FIG. 2 which shows the ends of the first stem only.

The valve member 14 is a disk in form, as best seen in FIG. 2 showing the appearance thereof, and is provided with cylindrical portions 39, 39 through which the short stems 13a, 13b are planted respectively. The valve member 14 is so formed that it becomes thinner toward its periphery and its peripheral edge is of substantially convergent form as shown in FIG. 6. This peripheral edge 40 is formed convergent by chamfering the same from either side. Alternatively, the valve member may be molded using a metal mold adapted to form the peripheral edge 40 in a convergent form with a round top.

Referring to FIG. 2, the numeral 41 designates a press plate pressing the sealing assembly 15 and the stem guide 23, which is secured to the neck 22 of the valve body 11 by means of a plurality of bolts 42. A bottom cover 43, which is adapted to press the sealing assembly 15 and the stem guide 24 from the lower portion of the valve, is secured to the valve body 11 by means of a plurality of bolts 44, thereby preventing dislodgement of the second short stem 13b.

Figure 7:
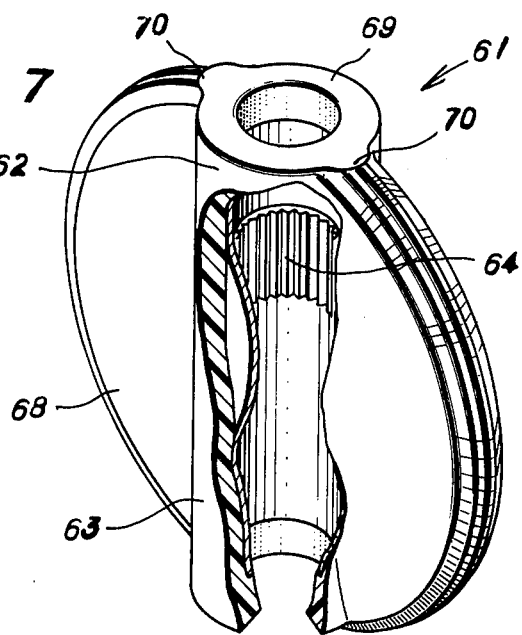
FIG. 7 is a partially cutaway view in perspective of a modified embodiment of the valve member.

Referring to FIG. 7 showing a modified embodiment of the valve member, the valve member 61 is provided with a diametrally formed cylindrical portion 62 through which is passed the valve stem comprising a integrally formed shaft. In the interior of the cylindrical portion 62 is contained and fixed a cylindrical member 63 of metal, the inner peripheral surface of which is provided with a spline 64 of a desired length. The valve stem 13 having a preformed spline (not shown) for engaging the spline 64 is inserted into the cylindrical member 63 of the valve member 61, so that both splines are engaged with each other, thereby permitting the valve stem 13 and the valve member 61 to be tightly secured to each other.

The valve member is formed from synthetic resin, such as fluororesin or the like. Therefore, the valve member is useful especially when a valve member of metal cannot be used because of the chemical fluid. The cylindrical member 63 of metal serves to reinforce the valve member itself.

At the ends of the cylindrical portion 62 of the valve member 61 intersecting the peripheral edge 68 thereof, there are provided flat portions 69, 69 perpendicular to the valve stem 13 respectively. Further, parts of the peripheral edge 68 adjacent to each of the ends of the cylindrical portion 62 are formed in planes 70 extending from the flat portions 69, 69. The formation of these planes 70 permits other parts of the peripheral edge to the chamfered in a convergent form without any damage to the flat portions 69, 69. The flat portions 69, 69 are adapted to closely contact with flat parts (not shown) of the valve seat 12 so as to seal against leakage of the fluid from between the valve member and the valve seat, even if the valve member is rotated. Therefore, leakage may occur if a notch or the like is formed on the flat portions 69, 69 when the latter are chamfered. According to the present invention, an effective seal between the valve seat 12 and the valve member 61 is achieved by the provision of the flat portions 69, 69 and the extended planes 70. This structure of the valve member 61 is applied to the valve member 14.

Figure 8:
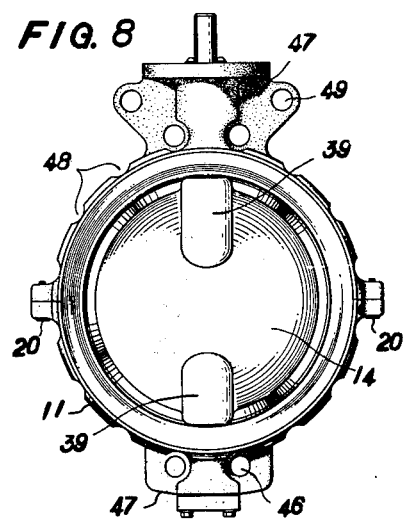
FIG. 8 is a front view of a butterfly valve with the valve member in position where the flowway passing through the valve seat is closed.

The butterfly valve 10, having the structure described above in detail, is fixed between the tubular flange members 16, 16 by means of a plurality of bolts 45. The butterfly valve 10 is clamped by means of the tubular flange members 16, 16, thereby permitting the valve 10 to be fixed sufficiently. However, in this case the valve 10 is apt to slip in the circumferential direction. According to the present invention, two fixing sections 47 having bolt-inserting holes are provided at the upper and lower portions of the valve body 11 respectively, and a plurality of recesses 48 for receiving the bolts are formed at intervals in the outer peripheral surface of the valve body 11. The numeral 49 seen in FIG. 2 designates hook holes for hanging the valve body, which are disposed at either side of the upper portion of the valve body. In case of using a butterfly valve 10 as shown in FIGS. 2 and 8, it is secured to the tubular flange members with 16 bolts. The number of bolts is not limited to 16, of course, and the butterfly valve can be mounted not only on the tubular flange members, but it may be mounted directly onto other devices.

What is claimed is:

1. A butterfly valve comprising:

a valve body consisting of upper and lower halves and having an annular projection formed at an inner peripheral wall thereof for being accepted and held by an annular groove of a valve seat and further including annular end faces disposed so as to engage with corresponding faces of spaced apart conduits when installed therebetween;

a valve seat having an annular groove into which the projection of said valve body is fitted, and including an external peripheral surface which fits to an internal peripheral surface of said valve body and further including a seat surface formed at an internal peripheral surface thereof;

a rotatably supported valve stem passing through stem-inserting ports in said valve body and said valve seat, one end thereof protruding beyond the valve body;

a disk-shaped valve member with a peripheral edge thinner than its central portion supported by the valve stem inside of the valve seat;

annular sealing assemblies which are disposed in the interior of said stem-inserting ports of the valve seat and through which the valve stem is fitted to seal said ports around said valve stem, and a stem guide provided between said stem and said body for permitting the stem to rotate and for pressing said sealing assemblies in a radially inward direction of said valve;

said valve seat comprising a first layer so formed as to have a substantially uniform thickness of hard synthetic resin and provided with said annular groove for fitting to the annular projection of the valve body, a second layer of resilient material covering the inner peripheral surface and either side surface of said first layer, and a third layer comprising a substantially uniform thin film of fluororesin, the inner peripheral portion of said second layer being sufficiently thick and resilient as to maintain the compression between the body and the valve disk in the closed position of the valve disk while the two side peripheral portions of the second layer, are less than half the thickness of the inner peripheral portion of the second layer so as to permit the space between said valve body and said conduits to be effectively sealed, said third layer being adhered to the inner peripheral surface and either side surface of the second layer and further extending into the inner peripheral surface of the stem-inserting ports at least to the second layer through which said valve stem is inserted, and further provided with an annular projection at the inner peripheral surface of stem-inserting ports of the third layer so as to press radially inwardly the valve stem for sealing a space between the valve seat and the valve stem, said seat surface of the valve seat comprising two side portions and a radially inwardly extending portion defined therebetween which presses radially inwardly the valve disk in the closed position, and said annular sealing assemblies comprising a resilient rubber ring and an O-ring of fluororesin disposed nearer to the valve member than the rubber ring.

2. A butterfly valve as claimed in claim 1, wherein an inner peripheral portion of each of said stem-inserting ports of the third layer defines an external surface that is in contact with the first and second layers and an internal surface that is in in contact with the valve stem, the sealing assemblies and the end external surfaces of the stem guide.

3. A butterfly valve as claimed in claim 1, wherein the central portion of the inner peripheral surface of the valve seat is raised so as to provide a convex contour thereon, whereby the inner diameter of the valve seat corresponding to said convex portion is smaller than the diameter of the valve member.

4. A butterfly valve as claimed in claim 1 wherein said O-ring comprises a ring of V-shaped section.

5. A butterfly valve as claimed in claim 1, wherein the valve member is made of synthetic resin and includes a cylindrical member of metal planted therein, through which the valve stem is inserted in the diametrical direction.

6. A butterfly valve as claimed in claim 5, wherein said cylindrical member made of metal of the valve member has an inner peripheral surface provided with a spline extending for a desired distance.

* * * * *